(12) United States Patent
Hasegawa

(10) Patent No.: US 11,991,578 B2
(45) Date of Patent: May 21, 2024

(54) BASE STATION DEVICE, TERMINAL DEVICE, WIRELESS COMMUNICATION SYSTEM, AND CONNECTION CHANGE METHOD

(71) Applicant: FUJITSU LIMITED, Kawasaki (JP)

(72) Inventor: Tetsuya Hasegawa, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 17/489,873

(22) Filed: Sep. 30, 2021

(65) Prior Publication Data

US 2022/0022116 A1 Jan. 20, 2022

Related U.S. Application Data

(63) Continuation of application No. PCT/JP2019/014547, filed on Apr. 1, 2019.

(51) Int. Cl.
*H04W 36/12* (2009.01)
*H04W 16/26* (2009.01)
*H04W 36/38* (2009.01)

(52) U.S. Cl.
CPC ......... *H04W 36/12* (2013.01); *H04W 16/26* (2013.01); *H04W 36/38* (2013.01)

(58) Field of Classification Search
CPC ..... H04W 36/12; H04W 16/26; H04W 36/38; H04W 36/0055; H04W 40/22;
(Continued)

(56) References Cited

U.S. PATENT DOCUMENTS 9,603,150 B2 * 3/2017 Yang ................. H04W 36/0072
2011/0242970 A1 * 10/2011 Prakash ................. H04W 76/38
370/216

(Continued)

FOREIGN PATENT DOCUMENTS

JP 2012-100169 A 5/2012
JP 2018-525874 A 9/2018
(Continued)

OTHER PUBLICATIONS

Extended European search report with the supplementary European search report and the European search opinion, issued by the European Patent Office for corresponding European Patent Application No. 19923280.2-1212, dated Mar. 1, 2022.
(Continued)

*Primary Examiner* — Hoang-Chuong Q Vu
(74) *Attorney, Agent, or Firm* — Myers Wolin, LLC

(57) ABSTRACT

A base station device includes: a processor that executes a process including judging whether each of a plurality of nodes that forms a relay network by establishing a wireless connection with each other and that is connected to the base station device is allowed to be connected to another base station device, and generating, when it is judged that a first node is allowed to be connected to the another base station device, connection information that includes information related to the another base station device; and a transmitter that transmits, via the first node, the connection information to a second node that is connected to a lower level of the first node in the relay network, and a terminal device that performs wireless communication with the first node or the second node.

6 Claims, 8 Drawing Sheets

(58) Field of Classification Search
CPC . H04W 84/047; H04W 88/085; H04W 92/20; H04B 7/2606
See application file for complete search history.

(56) References Cited

U.S. PATENT DOCUMENTS

| | | | |
|---|---|---|---|
| 2013/0208653 A1 | 8/2013 | Morioka et al. | |
| 2013/0337813 A1* | 12/2013 | Van Phan | H04W 84/005 455/436 |
| 2019/0059126 A1 | 2/2019 | Morita et al. | |
| 2020/0084819 A1* | 3/2020 | Abedini | H04W 76/15 |
| 2021/0160735 A1* | 5/2021 | Fujishiro | H04W 76/30 |
| 2021/0219368 A1* | 7/2021 | Fujishiro | H04W 76/19 |
| 2021/0258244 A1* | 8/2021 | Xu | H04L 45/28 |
| 2021/0274404 A1* | 9/2021 | Koziol | H04W 36/0055 |
| 2021/0345218 A1* | 11/2021 | Tsuda | H04W 92/14 |
| 2021/0368360 A1* | 11/2021 | Akl | H04W 92/20 |
| 2022/0132337 A1* | 4/2022 | Muhammad | H04W 40/34 |
| 2022/0132388 A1* | 4/2022 | Ishii | H04W 36/305 |
| 2022/0141732 A1* | 5/2022 | Wu | H04W 36/08 370/331 |
| 2023/0118291 A1* | 4/2023 | Wang | H04W 76/11 370/331 |

FOREIGN PATENT DOCUMENTS

| | | |
|---|---|---|
| WO | 2017/004253 A1 | 1/2017 |
| WO | 2017/188304 A1 | 11/2017 |
| WO | 2018/198178 A1 | 11/2018 |

OTHER PUBLICATIONS

Lenovo et al., "Backhaul link reselection", Agenda Item: 11.1.3, 3GPP TSG-RAN WG2 Meeting #102, R2-1807902, Busan, Korea, May 21-25, 2018.
3GPP TS 38.401 V15.5.0, "3rd Generation Partnership Project; Technical Specification Group Radio Access Network; NG-RAN; Architecture description (Release 15)", Mar. 2019.
3GPP TR 38.874 V16.0.0, "3rd Generation Partnership Project; Technical Specification Group Radio Access Network; NR; Study on Integrated Access and Backhaul; (Release 16)", Dec. 2018.
International Search Report and Written Opinion of the International Searching Authority issued by the Japan Patent Office for corresponding International Patent Application No. PCT/JP2019/014547, dated Jun. 18, 2019, with an English translation.
Kyocera, "Consideration of topology adaptation in IAB", Agenda Item: 11.1.3, 3GPP TSG-RAN WG2 Meeting #103, R2-1811843, Gothenburg, Sweden, Aug. 20-24, 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHz (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
3GPP TS 36.133 V15.5.0, "3rd Generation Partnership Project; Technical Specification Group Radio Access Network; Evolved Universal Terrestrial Radio Access (E-UTRA); Requirements for support of radio resource management (Release 15)", Dec. 2018.
3GPP TS 36.211 V15.4.0, "3rd Generation Partnership Project; Technical Specification Group Radio Access Network; Evolved Universal Terrestrial Radio Access (E-UTRA); Physical channels and modulation (Release 15)", Dec. 2018.
3GPP TS 36.212 V15.4.0, "3rd Generation Partnership Project; Technical Specification Group Radio Access Network; Evolved Universal Terrestrial Radio Access (E-UTRA); Multiplexing and channel coding (Release 15)", Dec. 2018.
3GPP TS 36.213 V15.4.0, "3rd Generation Partnership Project; Technical Specification Group Radio Access Network; Evolved Universal Terrestrial Radio Access (E-UTRA); Physical layer procedures (Release 15)", Dec. 2018.
3GPP TS 36.300 V15.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2018.
3GPP TS 36.321 V15.4.0, "3rd Generation Partnership Project; Technical Specification Group Radio Access Network; Evolved Universal Terrestrial Radio Access (E-UTRA); Medium Access Control (MAC) protocol specification (Release 15)", Dec. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.2.0, "3rd Generation Partnership Project; Technical Specification Group Radio Access Network; Evolved Universal Terrestrial Radio Access (E-UTRA); Packet Data Convergence Protocol (PDCP) specification (Release 15)", Dec. 2018.
3GPP TS 36.331 V15.4.0, "3rd Generation Partnership Project; Technical Specification Group Radio Access Network; Evolved Universal Terrestrial Radio Access (E-UTRA); Radio Resource Control (RRC); Protocol specification (Release 15)", Dec. 2018.
3GPP TS 36.413 V15.4.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2018.
3GPP TS 36.423 V15.4.0, "3rd Generation Partnership Project; Technical Specification Group Radio Access Network; Evolved Universal Terrestrial Radio Access Network (E-UTRAN); X2 application protocol (X2AP) (Release 15)", Dec. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.4.0, "3rd Generation Partnership Project; Technical Specification Group Radio Access Network; NR; Services provided by the physical layer (Release 15)", Dec. 2018.
3GPP TS 38.211 V15.4.0, "3rd Generation Partnership Project; Technical Specification Group Radio Access Network; NR; Physical channels and modulation (Release 15)", Dec. 2018.
3GPP TS 38.212 V15.4.0, "3rd Generation Partnership Project; Technical Specification Group Radio Access Network; NR; Multiplexing and channel coding (Release 15)", Dec. 2018.
3GPP TS 38.213 V15.4.0, "3rd Generation Partnership Project; Technical Specification Group Radio Access Network; NR; Physical layer procedures for control (Release 15)", Dec. 2018.

(56) References Cited

OTHER PUBLICATIONS

3GPP TS 38.214 V15.4.0, "3rd Generation Partnership Project; Technical Specification Group Radio Access Network; NR; Physical layer procedures for data (Release 15)", Dec. 2018.
3GPP TS 38.215 V15.4.0, "3rd Generation Partnership Project; Technical Specification Group Radio Access Network; NR; Physical layer measurements (Release 15)", Dec. 2018.
3GPP TS 38.300 V15.4.0, "3rd Generation Partnership Project; Technical Specification Group Radio Access Network; NR; NR and NG-RAN Overall Description; Stage 2 (Release 15)", Dec. 2018.
3GPP TS 38.321 V15.4.0, "3rd Generation Partnership Project; Technical Specification Group Radio Access Network; NR; Medium Access Control (MAC) protocol specification (Release 15)", Dec. 2018.
3GPP TS 38.322 V15.4.0, "3rd Generation Partnership Project; Technical Specification Group Radio Access Network; NR; Radio Link Control (RLC) protocol specification (Release 15)", Dec. 2018.
3GPP TS 38.323 V15.4.0, "3rd Generation Partnership Project; Technical Specification Group Radio Access Network; NR; Packet Data Convergence Protocol (PDCP) specification (Release 15)", Dec. 2018.
3GPP TS 38.331 V15.4.0, "3rd Generation Partnership Project; Technical Specification Group Radio Access Network; NR; Radio Resource Control (RRC) protocol specification (Release 15)", Dec. 2018.
3GPP TS 38.401 V15.4.0, "3rd Generation Partnership Project; Technical Specification Group Radio Access Network; NG-RAN; Architecture description (Release 15)", Dec. 2018.
3GPP TS 38.410 V15.2.0, "3rd Generation Partnership Project; Technical Specification GroupRadio Access Network; NG-RAN; NG general aspects and principles (Release 15)", Dec. 2018.
3GPP TS 38.413 V15.2.0, "3rd Generation Partnership Project; Technical Specification Group Radio Access Network; NG-RAN; NG Application Protocol (NGAP) (Release 15)", Dec. 2018.
3GPP TS 38.420 V15.2.0, "3rd Generation Partnership Project; Technical Specification Group Radio Access Network; NG-RAN; Xn general aspects and principles (Release 15)", Dec. 2018.
3GPP TS 38.423 V15.2.0, "3rd Generation Partnership Project; Technical Specification Group Radio Access Network; NG-RAN; Xn application protocol (XnAP) (Release 15)", Dec. 2018.
3GPP TS 38.470 V15.4.0, "3rd Generation Partnership Project; Technical Specification Group Radio Access Network; NG-RAN; F1 general aspects and principles (Release 15)", Dec. 2018.
3GPP TS 38.473 V15.4.1, "3rd Generation Partnership Project; Technical Specification Group Radio Access Network; NG-RAN; F1 application protocol (F1AP) (Release 15)", Jan. 2019.
First Notification of Office Action and Search Report issued by the China National Intellectual Property Administration for corresponding Chinese Patent Application No. 201980095120.5, dated May 23, 2023, with an English translation.
Samsung, "Overview on IAB node migration", Agenda Item: 13.3.2.1 (Functions and Criteria), 3GPP TSG-RAN WG3 Meeting #103bis, R3-191557, Xi'an, China, Apr. 8-12, 2019.

* cited by examiner

BASE STATION DEVICE, TERMINAL DEVICE, WIRELESS COMMUNICATION SYSTEM, AND CONNECTION CHANGE METHOD

CROSS-REFERENCE TO RELATED APPLICATION

This application is a continuation of International Application No. PCT/JP2019/014547, filed on Apr. 1, 2019 and designating the U.S., the entire contents of which are incorporated herein by reference.

FIELD

The present invention relates to a base station device, a terminal device, a wireless communication system, and a connection change method.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, and monitoring systems for devices), there is a need to cope with services having various request conditions. Thus, in the communication standards for the fifth generation mobile communication (5G or New Radio (NR)), in addition to the standard technology of the fourth generation mobile communication (4G) (for example, Non Patent Literatures 1 to 11), there is a demand for a technology that implements higher-data-rate, higher-capacity, and lower-delay communication. Furthermore, regarding the fifth generation communication standards, technical studies are being conducted in 3GPP working groups (for example, TSG-RAN WG1, TSG-RAN WG2, and the like), and the first edition of the standard specification was released at the end of 2017 (Non Patent Literatures 12 to 38).

As described above, in 5G, in order to respond various kinds of services, support of a lot of use cases classified into enhanced mobile broadband (eMBB), massive machine type communications (Massive MTC), and ultra-reliable and low latency communication (URLLC) is conceived.

Furthermore, in 5G, studies have been conducted on a method of relaying communication between a base station device and a terminal device performed by another base station device. In this relay system, a plurality of base station devices arranged between a core network and the terminal device are wirelessly connected and relaying is performed by wireless communication established between the base station devices. The relaying performed in this way in 5G is also called Integrated Access and Backhaul (IAB), and allows multi hop relaying. Namely, an IAB donor that is a base station device and that is connected to the core network is able to communicate with the terminal device via a plurality of IAB nodes that corresponds to the other base station devices (Non Patent Literature 39).

Non Patent Literature 1: 3GPP TS 36.133 V15.5.0 (2018-12)
Non Patent Literature 2: 3GPP TS 36.211 V15.4.0 (2018-12)
Non Patent Literature 3: 3GPP TS 36.212 V15.4.0 (2018-12)
Non Patent Literature 4: 3GPP TS 36.213 V15.4.0 (2018-12)
Non Patent Literature 5: 3GPP TS 36.300 V15.4.0 (2018-12)
Non Patent Literature 6: 3GPP TS 36.321 V15.4.0 (2018-12)
Non Patent Literature 7: 3GPP TS 36.322 V15.1.0 (2018-07)
Non Patent Literature 8: 3GPP TS 36.323 V15.2.0 (2018-12)
Non Patent Literature 9: 3GPP TS 36.331 V15.4.0 (2018-12)
Non Patent Literature 10: 3GPP TS 36.413 V15.4.0 (2018-12)
Non Patent Literature 11: 3GPP TS 36.423 V15.4.0 (2018-06)
Non Patent Literature 12: 3GPP TS 36.425 V15.0.0 (2018-06)
Non Patent Literature 13: 3GPP TS 37.340 V15.4.0 (2018-12)
Non Patent Literature 14: 3GPP TS 38.201 V15.0.0 (2017-12)
Non Patent Literature 15: 3GPP TS 38.202 V15.4.0 (2018-12)
Non Patent Literature 16: 3GPP TS 38.211 V15.4.0 (2018-12)
Non Patent Literature 17: 3GPP TS 38.212 V15.4.0 (2018-12)
Non Patent Literature 18: 3GPP TS 38.213 V15.4.0 (2018-12)
Non Patent Literature 19: 3GPP TS 38.214 V15.4.0 (2018-12)
Non Patent Literature 20: 3GPP TS 38.215 V15.4.0 (2018-12)
Non Patent Literature 21: 3GPP TS 38.300 V15.4.0 (2018-12)
Non Patent Literature 22: 3GPP TS 38.321 V15.4.0 (2018-12)
Non Patent Literature 23: 3GPP TS 38.322 V15.4.0 (2018-12)
Non Patent Literature 24: 3GPP TS 38.323 V15.4.0 (2018-12)
Non Patent Literature 25: 3GPP TS 38.331 V15.4.0 (2018-12)
Non Patent Literature 26: 3GPP TS 38.401 V15.4.0 (2018-12)
Non Patent Literature 27: 3GPP TS 38.410 V15.2.0 (2018-12)
Non Patent Literature 28: 3GPP TS 38.413 V15.2.0 (2018-12)
Non Patent Literature 29: 3GPP TS 38.420 V15.2.0 (2018-12)
Non Patent Literature 30: 3GPP TS 38.423 V15.2.0 (2018-12)
Non Patent Literature 31: 3GPP TS 38.470 V15.4.0 (2018-12)
Non Patent Literature 32: 3GPP TS 38.473 V15.4.1 (2019-01)
Non Patent Literature 33: 3GPP TR 38.801 V14.0.0 (2017-03)
Non Patent Literature 34: 3GPP TR 38.802 V14.2.0 (2017-09)
Non Patent Literature 35: 3GPP TR 38.803 V14.2.0 (2017-09)
Non Patent Literature 36: 3GPP TR 38.804 V14.0.0 (2017-03)
Non Patent Literature 37: 3GPP TR 38.900 V15.0.0 (2018-06)
Non Patent Literature 38: 3GPP TR 38.912 V15.0.0 (2018-06)
Non Patent Literature 39: 3GPP TR 38.913 V15.0.0 (2018-06)

Incidentally, the function of the base station device serving as the IAB donor is divided into a wireless control device that is a central unit (CU) and a wireless device that is a distributed unit (DU), and the function of the base station device that is the IAB node is divided into a mobile termination (MT) function that terminates a wireless backhaul link and the DU. At this time, IAB node serving as the relay station has the same physical cell ID (PCI) and the same global RAN node ID as those of the CU included in the IAB donor that is the highest level node. Namely, a plurality of base station devices are identified as the same base station devices that form a single cell.

Accordingly, if the IAB donor at the highest level is changed, there is a problem in that a radio link failure (RLF) occurs in IAB nodes and terminal devices in a lower level. Specifically, for example, as illustrated in FIG. 1, consider a case in which IAB nodes #1 to #3 and terminal devices of UEs #1 to #3 are connected under an IAB donor #1 that is at the highest level. In this case, the IAB nodes #1 to #3 have the same PCI and the global RAN node IDs as those held by the CU included in the IAB donor #1, and the IAB donor #1, and the IAB nodes #1 to #3 are identified as the same base station device.

The IAB donor #1 and the IAB nodes #1 to #3 are wirelessly connected with each other, so that, if a state of a wireless link is changed, topology adaptation that changes a connection relationship between devices is performed. Namely, for example, if the state of the wireless link between the base station devices is degraded, a handover that changes the connection relationship between the base station devices is performed. Therefore, for example, if the state of the wireless link between the IAB donor #1 and the IAB node #1 is degraded, for example, the IAB node #1 performs a handover from the IAB donor #1 to an IAB donor #2.

At this time, the IAB node #1 is directly connected to the IAB donor #1 and the IAB donor #2 that are the highest level node, so that the connection change of the IAB node #1 follows a change in the PCI and the global RAN node ID in accordance with a change in the highest level node. In contrast, the IAB nodes #2, #3 and the UEs #1 to #3 that are at the lower level of the IAB node #1 are not able to follow a sudden change in the PCI and the global RAN node ID and detect occurrence of RLF. As a result, a connection of the communication device disposed at the lower level than the IAB node #1 is not maintained and it is thus difficult to continue communication.

SUMMARY

According to an aspect of an embodiment of the invention, a base station device includes: a processor that executes a process including judging whether each of a plurality of nodes that forms a relay network by establishing a wireless connection with each other and that is connected to the base station device is allowed to be connected to another base station device, and generating, when it is judged that a first node is allowed to be connected to the another base station device, connection information that includes information related to the another base station device; and a transmitter that transmits, via the first node, the connection information to a second node that is connected to a lower level of the first node in the relay network, and a terminal device that performs wireless communication with the first node or the second node.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of a base station device, a terminal device, a wireless communication system, and a connection change method disclosed in the present invention will be explained in detail below with reference to the accompanying drawings. Furthermore, the present invention is not limited to the embodiments.

Figure 1:
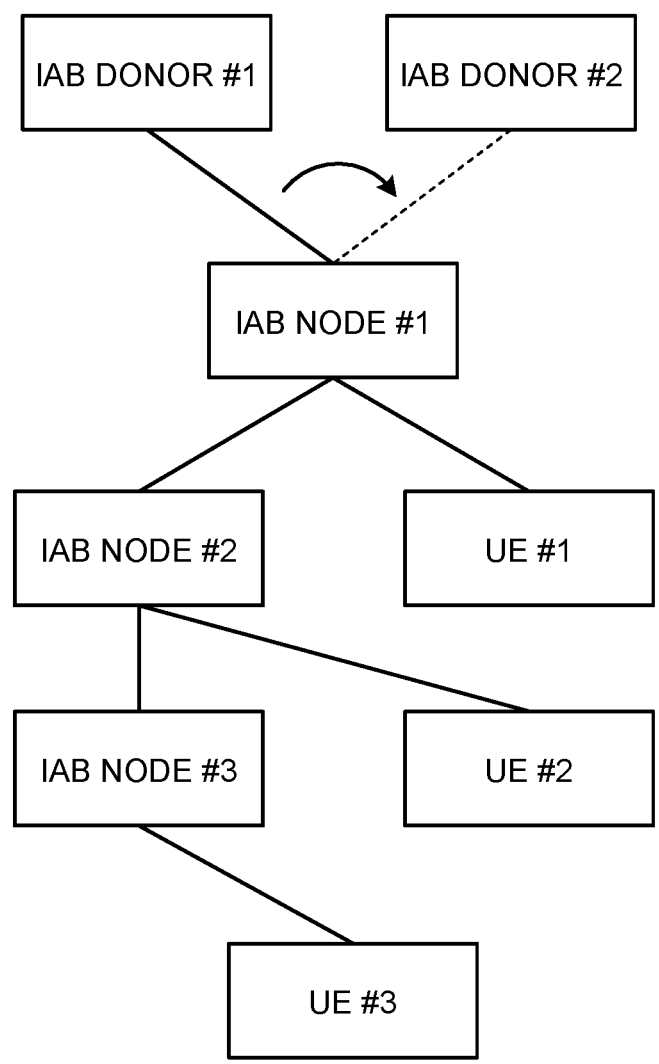
FIG. 1 is a diagram illustrating an example of a connection relationship among communication devices.
Figure 2:
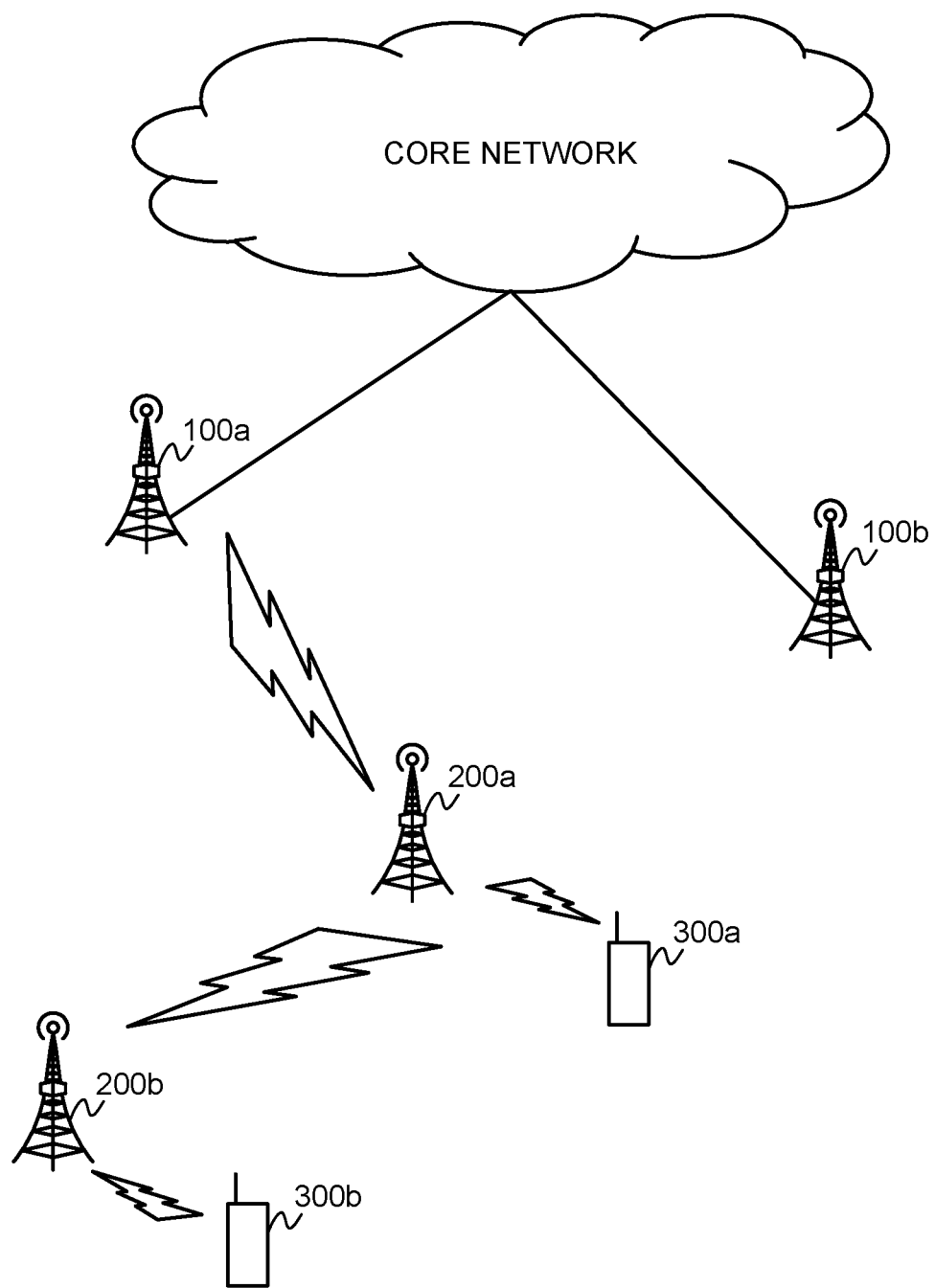
FIG. 2 is a diagram illustrating an example of a wireless communication system according to an embodiment.

FIG. 2 is a diagram illustrating an example of a wireless communication system according to an embodiment. In the wireless communication system, base station devices 100*a* and 100*b* are connected to a core network by using a wired connection. The base station devices 100*a* and 100*b* that are directly connected to the core network are communication devices at the highest level in a relay network ad are also referred to as "IAB donors". A base station device 200*a* establishes a wireless connection to the base station device 100*a* and the base station device 200*b* establishes a wireless connection to the base station device 200*a*.

The base station devices 200*a* and 200*b* are communication devices that relay communication received from the base station device 100*a* corresponding to the IAB donor and that are also referred to as "IAB nodes". The base station devices 200*a* and 200*b* establish a wireless connection with each other to form a relay network and connect to the IAB donor. Furthermore, the base station device 200*a* performs wireless communication with a terminal device 300*a*, whereas the base station device 200*b* performs wireless communication with a terminal device 300*b*.

In a description below, similarly to the base station devices 100*a* and 100*b*, a base station device that serves as an IAB donor is sometimes referred to as a "base station device 100", whereas, similarly to the base station devices 200*a* and 200*b*, a base station device that serves as an IAB node is sometimes referred to as a "base station device 200". Similarly, the terminal devices 300*a* and 300*b* are sometimes referred to as a "terminal device 300". Furthermore, in communication devices, such as the base station devices 100 and 200 and the terminal device 300, that constitutes a relay network, it is assumed that a communication device that is closer to the core network is a communication device disposed at a higher level, and a communication device that is away from the core network is a communication device disposed at a lower level.

In FIG. 2, the base station device 200*a* establishes a wireless connection to the base station device 100*a*; however, if a state of the wireless link is changed and if, for example, the quality of the wireless link between the base station device 200a and the base station device 100b is better than the quality of the wireless link between the base station device 200a and the base station device 100a, topology adaptation is performed. Namely, for example, a handover for changing the IAB donor, to which the base station device 200a is connected, from the base station device 100a to the base station device 100b is performed.

Figure 3:
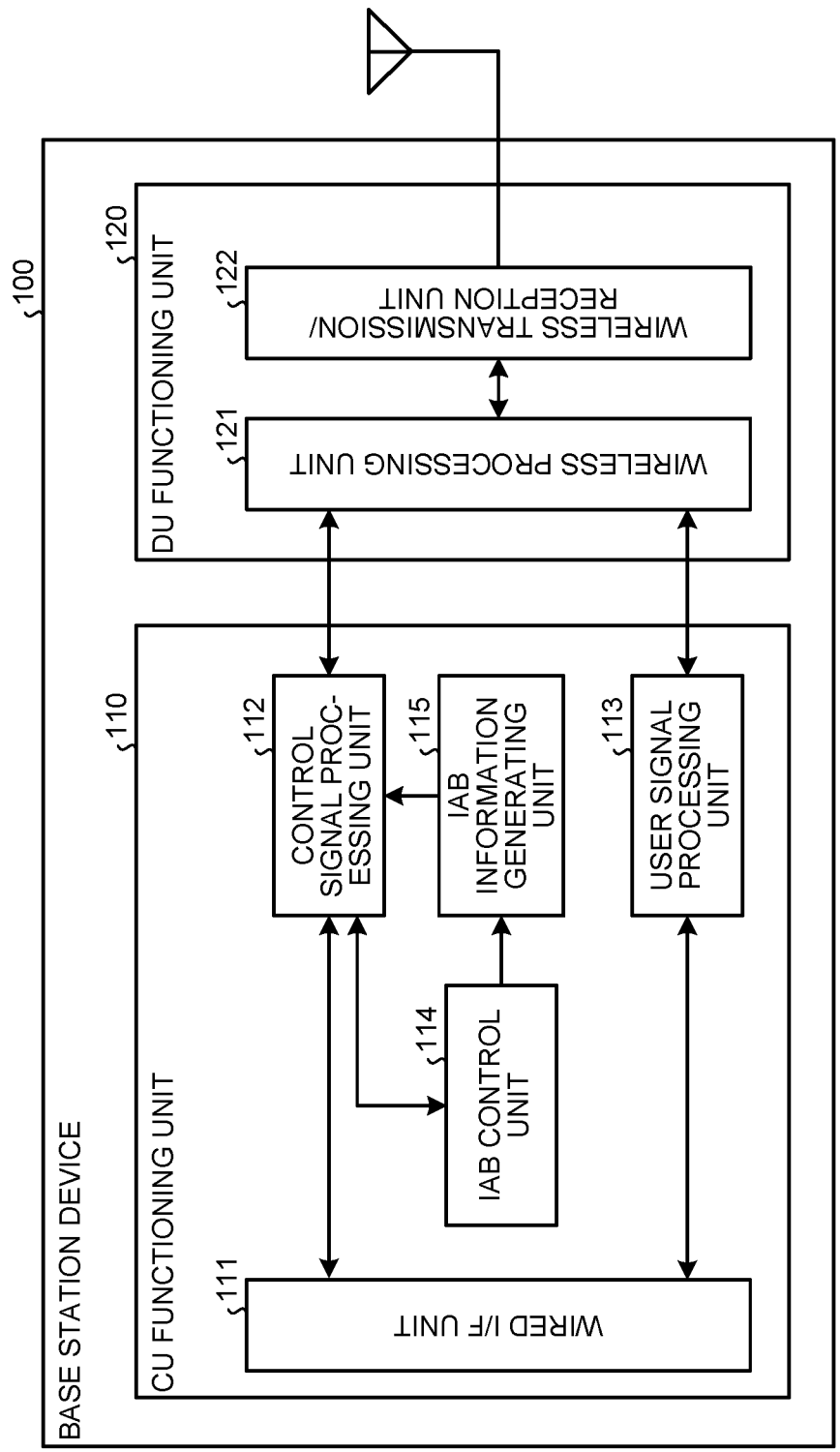
FIG. 3 is a block diagram illustrating a configuration of a base station device according to the embodiment.

FIG. 3 is a block diagram illustrating a configuration of the base station device 100 that serves as the IAB donor. The base station device 100 illustrated in FIG. 3 includes a CU functioning unit 110 and a DU functioning unit 120. In FIG. 3, it is assumed that the number of the CU functioning units 110 and the DU functioning units 120 included in the base station device 100 is one; however, the base station device 100 may also include a plurality of the CU functioning units 110 or a plurality of the DU functioning units 120. Furthermore, the association relationship between the CU functioning unit 110 and the DU functioning unit 120 may also be any relationship among a one-to-one relationship, a one-to-many relationship, and a many-to-one relationship.

The CU functioning unit 110 is a wireless communication control unit that controls wireless communication performed by the base station device 100. Specifically, the CU functioning unit 110 has a wired interface unit (hereinafter, simply referred to as a "wired I/F unit") 111, a control signal processing unit 112, a user signal processing unit 113, an IAB control unit 114, and an IAB information generating unit 115.

The wired I/F unit 111 establishes a wired connection to the core network and receives, from the core network, a signal addressed to the terminal device 300. Furthermore, the wired I/F unit 111 transmits, to the core network, a signal transmitted from the terminal device 300. The wired I/F unit 111 may also establish a wired connection to, other than the core network, another CU functioning unit included in the other base station device.

The control signal processing unit 112 is a processing unit that functions as a control plane and that processes a control signal. The control signal processing unit 112 performs setting related to measurement of wireless quality between, for example, base station devices or between a base station device and a terminal device, or performs scheduling related to transmission and reception of a signal between the base station devices or between the base station device and the terminal device. Furthermore, the control signal processing unit 112 transmits, via the DU functioning unit 120, IAB information that is generated by the IAB information generating unit 115 to communication devices (the base station device 200 and the terminal device 300) disposed at a lower level of the base station device 100. Namely, when the IAB node is subjected to handover, the control signal processing unit 112 transmits the IAB information to the communication device disposed at the lower level.

At this time, the control signal processing unit 112, first, transmits the IAB information to the communication device disposed at the lower level of the IAB node that is subjected to handover, and then transmits, after elapse of predetermined time, the IAB information to the IAB node that is subjected to handover. Namely, for example, the control signal processing unit 112 included in the base station device 100a illustrated in FIG. 2 transmits, when the base station device 200a performs a handover, the IAB information to the base station device 200b and the terminal devices 300a and 300b and then transmits, after elapse of predetermined time, the IAB information to the base station device 200a. However, in also a case in which the IAB information is transmitted to the base station device 200b and the terminal devices 300a and 300b, the base station device 200a relays the IAB information. The control signal processing unit 112 transmits the IAB information as a message of, for example, a radio resource control (RRC) layer.

The user signal processing unit 113 is a processing unit functioning as a user plane that performs a process on a user signal. The user signal processing unit 113 transmits a signal addressed to the terminal device 300 to the terminal device 300 via the DU functioning unit 120. Furthermore, the user signal processing unit 113 outputs, to the wired I/F unit 111, a signal that is transmitted from the terminal device 300 and that is received by the DU functioning unit 120.

The IAB control unit 114 controls a connection relationship in an IAB. Specifically, the IAB control unit 114 determines a connection relationship between the IAB node and the terminal device 300 that are disposed at the lower level on the basis of a measurement result of the wireless quality between the base station devices or between the base station device and the terminal device. Furthermore, if the IAB control unit 114 determines that the wireless quality of the IAB node disposed at the lower level is degraded and determines that a handover process for allowing the subject IAB node to connect to another IAB donor is needed, the IAB control unit 114 generates a handover request. Then, the IAB control unit 114 transmits the handover request to the other IAB donor via the control signal processing unit 112 and the wired I/F unit 111.

If it is determined by the IAB control unit 114 that a handover of the IAB node is needed, the IAB information generating unit 115 generates IAB information with respect to the IAB node that is to be subjected to handover and the communication devices (the base station device 200 and the terminal device 300) that are the IAB nodes disposed at the lower level. Specifically, the IAB information generating unit 115 generates, on the basis of a response to the handover request transmitted from the IAB control unit 114, IAB information that includes, for each communication device, identification information on a new IAB donor at a handover destination, radio resource information that is used under the new IAB donor, standby time information that indicates a time period before the handover is performed, IAB connection information related to a topology that is used under the new IAB donor. The IAB connection information includes, for example, communication path identification information for identifying a communication path for each communication device, identification information on an IAB node disposed on each of the communication paths, a hop count to the IAB donor for each communication device, or the like.

The DU functioning unit 120 is a wireless unit that performs wireless communication by the base station device 100. Specifically, the DU functioning unit 120 includes a wireless processing unit 121 and a wireless transmission/reception unit 122.

The wireless processing unit 121 performs a predetermined wireless process on the control signal, in which a process is performed by the control signal processing unit 112, and on the user signal, in which a process is performed by the user signal processing unit 113.

The wireless transmission/reception unit 122 transmits, from an antenna, the control signal and the user signal that have been subjected to the wireless process by the wireless processing unit 121. Furthermore, the wireless transmission/reception unit 122 receives, via the antenna, the signal transmitted from the IAB node or the terminal device 300 that is disposed at the lower level.

Figure 4:
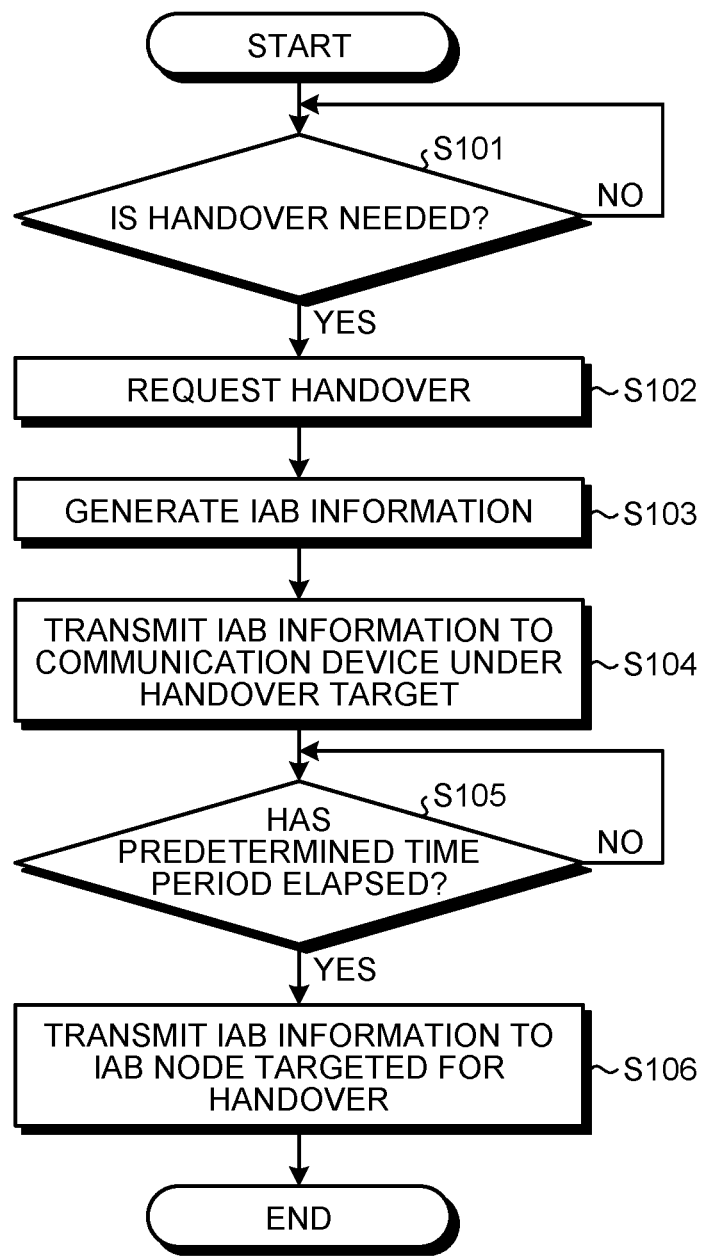
FIG. 4 is a flowchart illustrating an operation of the base station device according to the embodiment.

In the following, an operation performed by the base station device 100 having the configuration described above will be described with reference to the flowchart illustrated in FIG. 4.

The base station device 100 receives a report on the measurement result of each of the wireless quality from the IAB node and the terminal device 300 that are disposed at the lower level. Thus, it is judged, by the IAB control unit 114, on the basis of measurement results on the wireless quality, whether a handover of the IAB node disposed at the lower level is needed (Step S101). Namely, it is judged whether the wireless quality in the IAB node disposed at the lower level is more degraded than a predetermined criterion. If it is judged, by the IAB control unit 114, that a handover of the IAB node disposed at the lower level is unneeded (No at Step S101), a report on a next measurement result of wireless quality is waited.

In contrast, if it is judged, by the IAB control unit 114, that a handover of the IAB node disposed at the lower level is needed (Yes at Step S101), a handover request for requesting a handover is generated and is transmitted to the other IAB donor via the wired I/F unit 111 (Step S102). The IAB donor at the transmission destination of the handover request may be decided on the basis of the measurement result of the wireless quality reported from the IAB node that is a target for the handover. Namely, the IAB node measures the wireless quality between the own node and the surrounding IAB donors and the IAB nodes; therefore, the IAB control unit 114 decides an IAB donor having a favorable measurement result as a handover destination or decides an IAB donor disposed at the highest level that is connected by the IAB node that has a favorable measurement result.

If the handover request is transmitted by the IAB control unit 114, a response to the handover request is received from the IAB donor at the handover destination. The response includes information that indicates whether a handover of the IAB node is accepted and identification information of the IAB donor at the handover destination. Furthermore, the response may also include information related to a new topology in a case of a handover of the IAB node. If the handover of the IAB node is accepted, the IAB information is generated by the IAB information generating unit 115 on the basis of the response to the handover request (Step S103).

Specifically, the IAB information for notifying each of the IAB node targeted for the handover and each of the IAB nodes and the terminal device 300 that are disposed at the lower level of the handover target IAB node of information related to the new IAB donor at the handover destination is generated. The IAB information is individually generated for each of the communication devices (the base station device 200 and the terminal device 300), and includes the identification information on the new IAB donor at the handover destination, the radio resource information that is used under the new IAB donor, the standby time information that indicates a time period before the handover is performed, and the IAB connection information related to the topology that is used under the new IAB donor.

If the IAB information is generated, the IAB information is transmitted by the control signal processing unit 112. Here, first, the IAB information is transmitted, via the DU functioning unit 120, to the IAB nodes and the terminal device 300 disposed at the lower level of the IAB node that is targeted for the handover (Step S104). Namely, at this time point, the IAB information is not transmitted to the IAB node that is targeted for the handover. For example, in the example illustrated in FIG. 2, when the base station device 200a performs a handover, the IAB information is not transmitted to the base station device 200a but is transmitted to the base station device 200b and the terminal devices 300a and 300b. At this time, for example, the IAB information to be transmitted to the base station device 200b and the terminal device 300a is relayed by the base station device 200a. Similarly, for example, the IAB information to be transmitted to the terminal device 300b is relayed by the base station devices 200a and 200b.

Then, the control signal processing unit 112 waits for a predetermined time (Step S105), and, if a predetermined time has elapsed (Yes at Step S105), the IAB information is transmitted, via the DU functioning unit 120, to the IAB node that is targeted for the handover (Step S106). The predetermined time to be waited corresponds to the time indicated by the standby time information included in the IAB information. Therefore, at the end of the waiting performed by the IAB node and the terminal device 300 disposed at the lower level of the IAB node that is to be subjected to handover, the IAB information is transmitted to the IAB node to be subjected to handover, and the handover is performed by the IAB node. Accordingly, at the timing at which the IAB node is subjected to handover, the IAB node and the terminal device 300 disposed at the lower level ends the waiting and connect to the new IAB donor. As a result, the IAB node subjected to handover and both of the IAB node and the terminal device 300 that are disposed at the lower level of the IAB node subjected to handover connect to the new IAB donor, and thus a radio link failure does not occur. In other words, it is possible to continue communication at also the time of occurrence of topology adaptation.

Figure 5:
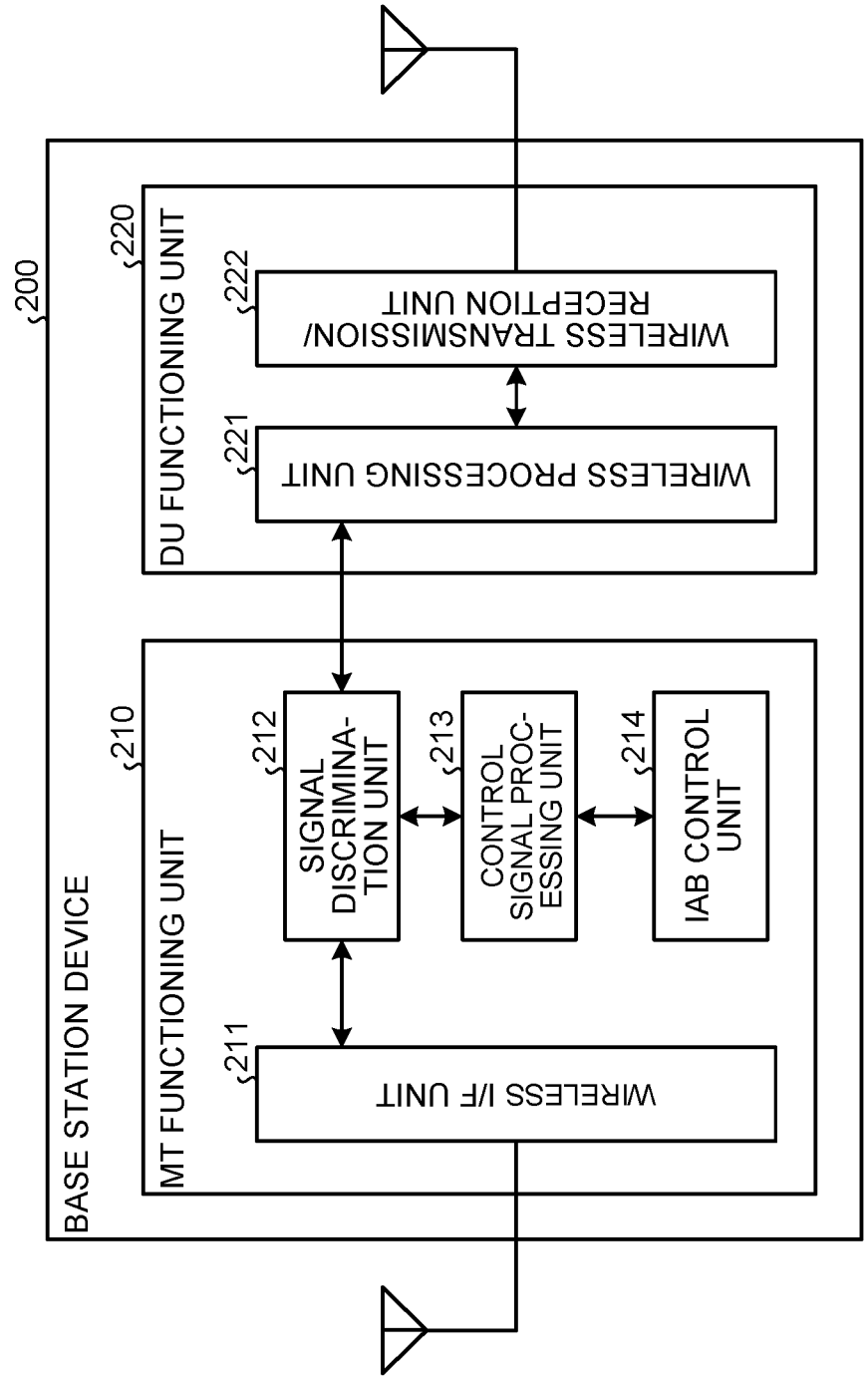
FIG. 5 is a block diagram illustrating a configuration of another base station device according to the embodiment.

FIG. 5 is a block diagram illustrating a configuration of the base station device 200 that is an IAB node. The base station device 200 illustrated in FIG. 5 includes an MT functioning unit 210 and a DU functioning unit 220.

The MT functioning unit 210 terminates a radio backhaul link between the base station devices. Specifically, the MT functioning unit 210 includes a wireless interface unit (hereinafter, simply referred to as a "wireless I/F unit") 211, a signal discrimination unit 212, a control signal processing unit 213, and an IAB control unit 214.

The wireless I/F unit 211 establishes a wireless connection to an IAB donor or an IAB node that is disposed at a higher level, and receives a signal addressed to the terminal device 300 from the IAB donor or the IAB node disposed at the higher level. Furthermore, the wireless I/F unit 211 transmits the signal transmitted from the terminal device 300 to the IAB donor or the IAB node that is disposed at the higher level.

The signal discrimination unit 212 judges the signal received by the wireless I/F unit 211 and acquires the IAB information addressed to the own device. Furthermore, the signal discrimination unit 212 transfers the signal addressed to the IAB node or the terminal device 300 disposed at the lower level to the DU functioning unit 220. Namely, the signal discrimination unit 212 relays the signal addressed to the IAB node or the terminal device 300 disposed at the lower level. The signal to be relayed includes the IAB information and the user signal addressed to the IAB node or the terminal device 300 that is addressed to the lower level. Furthermore, the signal discrimination unit 212 transmits, via the wireless I/F unit 211, the signal that is transmitted from the IAB node or the terminal device 300 disposed at the lower level and that is received by the DU functioning unit 220 to the IAB donor or the IAB node that is disposed at the higher level.

The control signal processing unit 213 is a processing unit that functions as a control plane and that processes a control signal. The control signal processing unit 213 performs setting related to measurement of wireless quality between, for example, base station devices or between a base station device and a terminal device. Furthermore, the control signal processing unit 213 outputs the IAB information addressed to the own device to the IAB control unit 214.

The IAB control unit 214 controls a connection relationship in an IAB. Specifically, the IAB control unit 214 manages the IAB nodes disposed at the higher level and the lower level and stores communication paths to the IAB donor. Furthermore, if the IAB information is output from the control signal processing unit 213, the IAB control unit 214 changes the currently connecting IAB donor in accordance with the IAB information. Namely, in a case of an IAB node that is subjected to handover by the base station device 200, the IAB control unit 214 connects to a new IAB donor in accordance with the IAB information. At this time, the IAB control unit 214 may also connect to the new IAB donor via the IAB node disposed at the lower level of the new donor. In contrast, in a case of an IAB node that is disposed at the lower level of the IAB node that is subjected to handover by the base station device 200, the IAB control unit 214 waits for a predetermined time in accordance with the IAB information, and then, connects to the new IAB donor via the IAB node that has been subjected to handover. Namely, if the own device or the IAB node that is disposed at the higher level performs a handover, the IAB control unit 214 connects to the CU included in the new IAB donor at the handover destination.

The DU functioning unit 220 is a wireless unit that performs wireless communication by using the base station device 200. Specifically, the DU functioning unit 220 includes a wireless processing unit 221 and a wireless transmission/reception unit 222.

The wireless processing unit 221 performs a predetermined wireless process on the control signal and the user signal that are judged by the signal discrimination unit 212.

The wireless transmission/reception unit 222 transmits, from the antenna, the control signal and the user signal that has been subjected to the wireless process performed by the wireless processing unit 221. Furthermore, the wireless transmission/reception unit 222 receives, via the antenna, the signal transmitted from the IAB node or the terminal device 300 disposed at the lower level.

Figure 6:
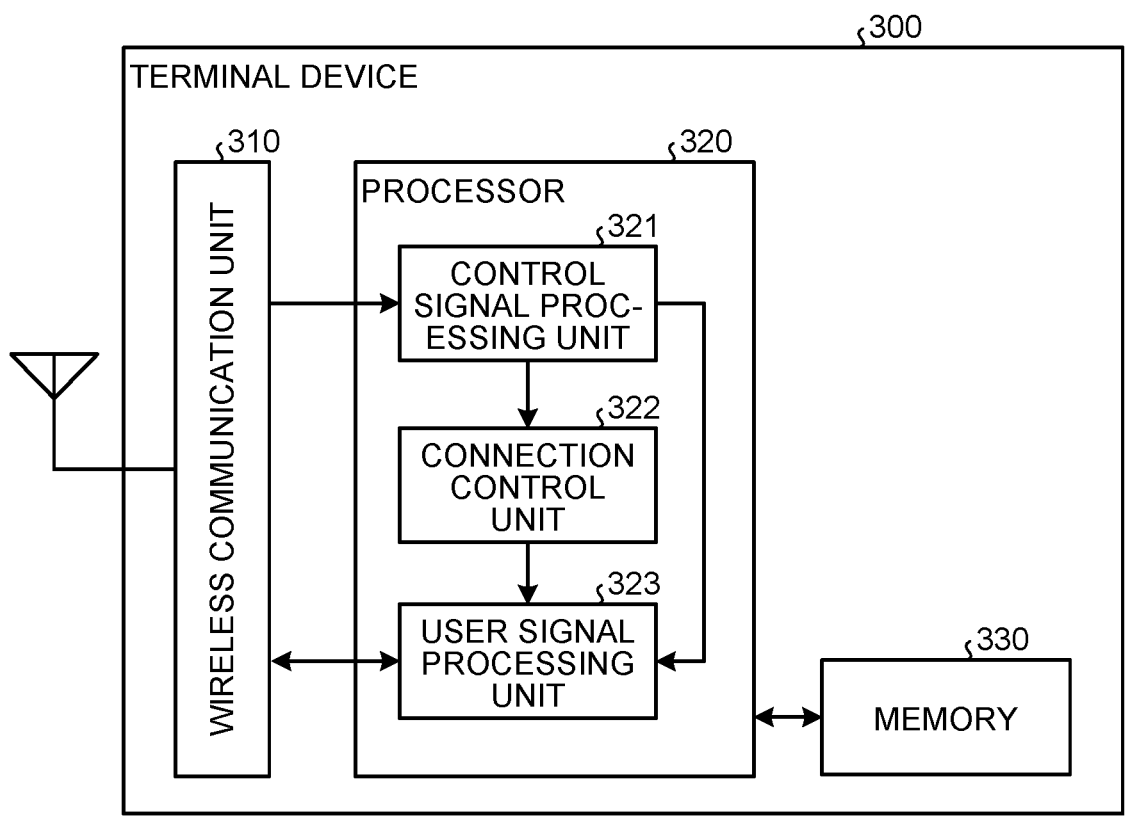
FIG. 6 is a block diagram illustrating a configuration of a terminal device according to the embodiment.

FIG. 6 is a block diagram illustrating a configuration of the terminal device 300. The terminal device 300 illustrated in FIG. 6 includes a wireless communication unit 310, a processor 320, and a memory 330.

The wireless communication unit 310 performs wireless communication with the base station device 100 or the base station device 200. The wireless communication unit 310 outputs the signal received from the base station device 100 or the base station device 200 to the processor 320, and transmits the signal that is output from the processor 320 to the base station device 100 or the base station device 200.

The processor 320 includes, for example a central processing unit (CPU), a field programmable gate array (FPGA), or a digital signal processor (DSP), and performs overall control of the terminal device 300. Specifically, the processor 320 includes a control signal processing unit 321, a connection control unit 322, and a user signal processing unit 323.

The control signal processing unit 321 is a processing unit that functions as a control plane and that performs a process on a control signal. The control signal processing unit 321 performs setting related to measurement of wireless quality between, for example, the own device and the base station device, and acquires control information that is used to demodulate and decode the user signal. Furthermore, the control signal processing unit 321 outputs the IAB information addressed to the own device to the connection control unit 322.

The connection control unit 322 stores the communication paths to the IAB donor. Furthermore, when an IAB node disposed at a higher level on the communication path is subjected to handover, the connection control unit 322 changes the IAB donor to be connected in accordance with the IAB information that is addressed to the own device. Namely, the connection control unit 322 waits for a predetermined time in accordance with the IAB information, and then, connects to a new IAB donor via the IAB node that has been subjected to handover. In other words, when the IAB node disposed at the higher level is subjected to handover, the connection control unit 322 connects to the CU included in the new IAB donor at the handover destination.

The user signal processing unit 323 is a processing unit that functions as a user plane and that processes a user signal. The user signal processing unit 323 demodulates and decodes, by using the control information, the signal that is addressed to the own device received by the wireless communication unit 310. Furthermore, the user signal processing unit 323 transmits, via the wireless communication unit 310, the user signal addressed to the IAB donor.

The memory 330 includes, for example, a random access memory (RAM), a read only memory (ROM), or the like, and stores various kinds of information when a process is performed by the processor 320.

Figure 7:
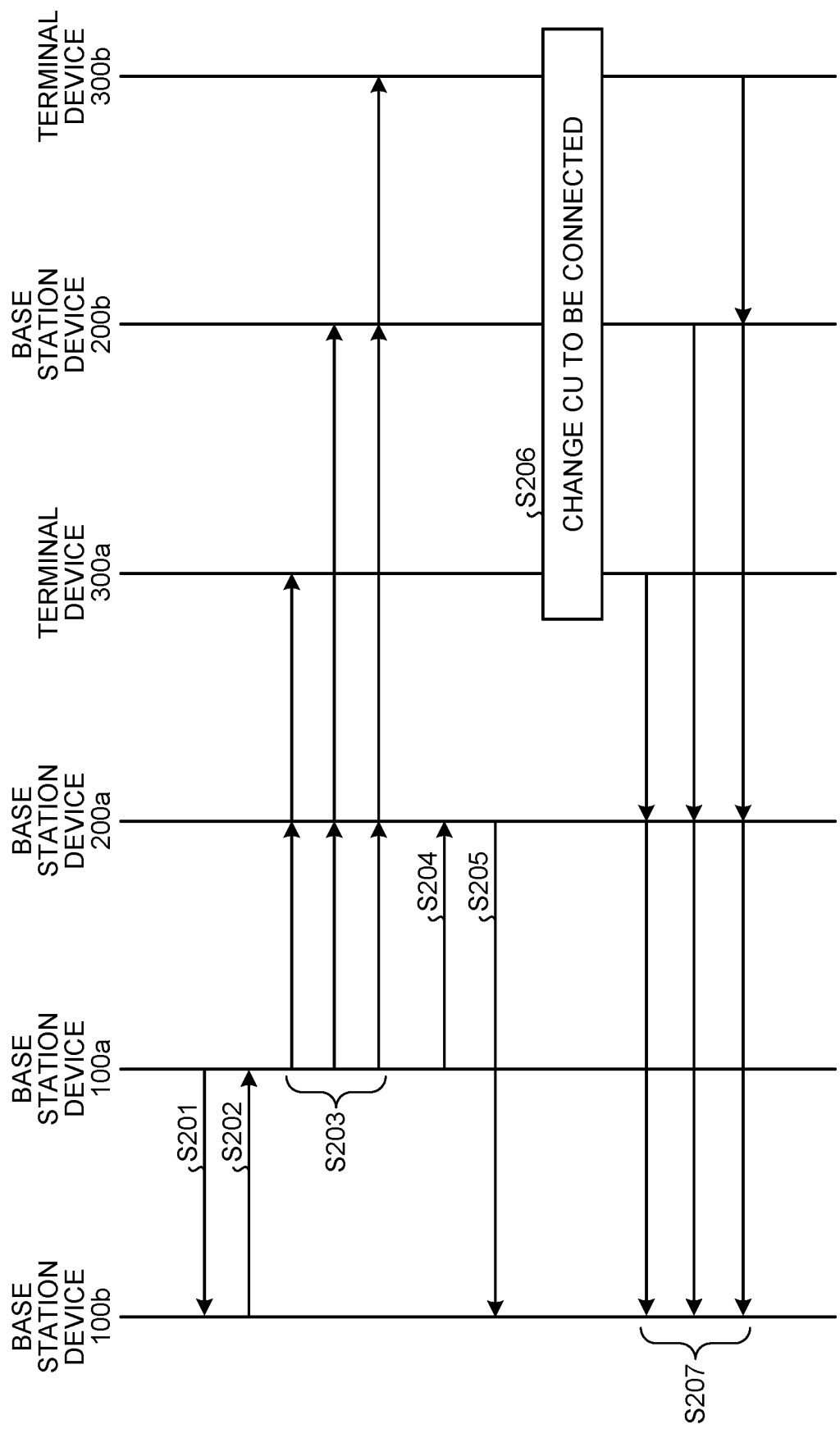
FIG. 7 is a sequence diagram illustrating a connection change method according to an embodiment.

In the following, a connection change method performed in a wireless communication system that includes the base station device 100, the base station device 200, and the terminal device 300 described above will be described with reference to the sequence diagram illustrated in FIG. 7. FIG. 7 indicates a connection change method used when the base station device 200a illustrated in FIG. 2 performs a handover from the base station device 100a to the base station device 100b.

The base station device 100a that is an IAB donor receives a report on the measurement result of the wireless quality, and, if the base station device 100a judges that the handover requested from the base station device 200a is needed, the base station device 100a transmits a handover request to the base station device 100b that is a new IAB donor at the handover destination (Step S201). The base station device 100b that receives the handover request decides a new topology that is used when the base station device 200a performs the handover, and transmits, to the base station device 100a, a response including the information related to the new topology together with permission of the handover (Step S202).

The base station device 100a that receives a response to the handover request generates the IAB information addressed to the communication devices that are disposed at the lower level of the base station device 200a targeted for the handover. Specifically, the IAB information that includes the identification information on the base station device 100b at the handover destination, the radio resource information that is used under the management of the base station device 100b, the standby time information that indicates a time period before the handover is performed, and the IAB connection information related to a topology that is used under the base station device 100b is generated for each communication device. Then, the base station device 100a transmits the generated IAB information to each of the communication devices (Step S203). Namely, the IAB information is transmitted to the base station device 200b and the terminal devices 300a and 300b. At this time, the IAB information with respect to the base station device 200b and the terminal device 300a is relayed by the base station device 200a. Furthermore, the IAB information with respect to the terminal device 300b is relayed by the base station devices 200a and 200b.

After the base station device 100a transmits the IAB information to the base station device 200b and the terminal devices 300a and 300b, if a predetermined time has elapsed, the base station device 100a transmits the IAB information to the base station device 200a that is targeted for the handover (Step S204). Consequently, the base station device 200a sends a report indicating that the handover has been performed and a reset of the communication path to the base station device 100b has been completed (Step S205).

In contrast, each of the base station device 200b and the terminal devices 300a and 300b that have received the IAB information changes, in accordance with the IAB information, the CU included in the IAB donor to be connected after an elapse of the standby time (Step S206). Namely, the base station device 200b and the terminal devices 300a and 300b connect to the CU in the base station device 100b that is a new IAB donor. Then, the base station device 200b and the terminal devices 300a and 300b reports the base station device 100b of the completion of the reset of the communication path (Step S207). At this time, a report from each of the base station device 200b and the terminal device 300a is relayed by the base station device 200a that has already performed that handover. Furthermore, a report from the terminal device 300b is relayed by the base station device 200b and the base station device 200a that has already performed the handover.

In this way, when the base station device 200a performs the handover, the IAB information is transmitted from the base station device 100a that is an IAB donor that is the source of handover to the communication device that is disposed at the lower level of the base station device 200a, and then, the IAB information is transmitted to the base station device 200a. Accordingly, the communication device disposed at the lower level of the base station device 200a is able to switch, in accordance with the handover performed by the base station device 200a, the CU to be connected to the CU of the base station device 100b that is a new IAB donor. As a result, even if the base station device 200a performs a handover, a radio link failure (RLF) does not occur in the communication device disposed at the lower level of the base station device 200a, and it is thus possible to continue communication.

As described above, according to the embodiment, when a handover process for changing a connected IAB node to another IAB donor is performed, the IAB information is transmitted to the IAB node and the terminal device that are disposed at the lower level of the IAB node, and then, the handover of the IAB node is performed. Accordingly, the IAB nodes and the terminal devices that are disposed at the lower level of the IAB node that is targeted for the handover is able to switch, in advance, the IAB donor to be connected, and, even if the IAB node that is targeted for the handover is subjected to the handover, a radio link failure does not occur in the IAB node and the terminal device that are disposed at the lower level. In other words, it is possible to continue communication even at the time of occurrence of topology adaptation.

Figure 8:
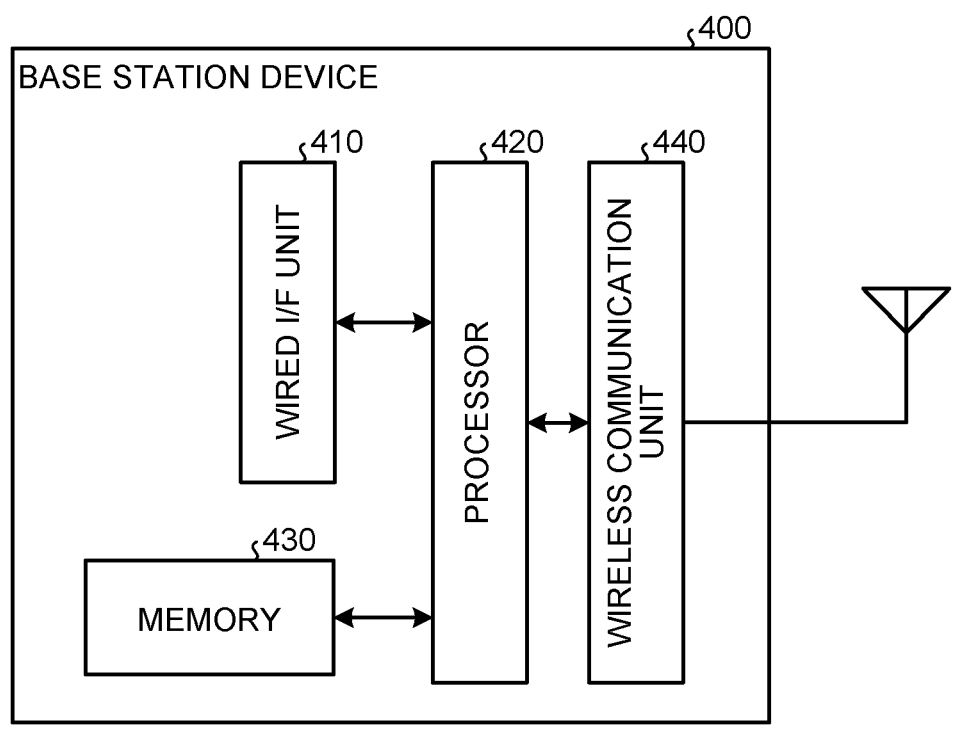
FIG. 8 is a block diagram illustrating a hardware configuration example of the base station device according to the embodiment.

Furthermore, it is assumed that the base station devices 100 and 200 according to the embodiment described above have different functions; however, the base station devices 100 and 200 may also have a same hardware configuration. FIG. 8 is a block diagram illustrating a base station device 400 having the same hardware configuration as that of the base station devices 100 and 200. The base station device 400 includes a wired I/F unit 410, a processor 420, a memory 430, and a wireless communication unit 440.

The wired I/F unit 410 is an interface for connecting to a core network and another base station device by using a wired connection. In an IAB, the base station devices establish a wireless connection; however, a wired connection may also be used between the IAB donor and the core network, and a wired connection may also be used between the IAB donors. Furthermore, a wired connection may also be used between an IAB node and another base station device.

The processor 420 includes, for example, a CPU, an FPGA, a DSP, or the like, and performs overall control of the base station device 400. The memory 430 includes, for example, a RAM, a ROM or the like, and stores therein various kinds of information when a process is performed by the processor 420. The processor 420 and the memory 430 functions as the CU functioning unit 110 included in the base station device 100 and the MT functioning unit 210 included in the base station device 200.

The wireless communication unit 440 performs a wireless process on the transmission signal and the reception signal and transmits the processed signals via the antenna. The wireless communication unit 440 functions as the DU functioning units 120 and 220 included in the base station devices 100 and 200, respectively.

According to an aspect of an embodiment of the base station device, the terminal device, the wireless communication system, and the connection change method disclosed in the present invention, an advantage is provided in that it is possible to continue communication even if topology adaptation occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
    processor circuitry that executes a process including
        judging whether each of a plurality of nodes that forms a relay network by establishing a wireless connection with each other and that is connected to the base station device is allowed to be connected to another base station device, and
        generating, when it is judged that a first node is allowed to be connected to the another base station device, connection information that includes information related to the another base station device and standby time indicating a time period before the first node connects to the another base station device; and
    a transmitter that transmits, via the first node, the connection information to a second node that is connected to a lower level of the first node in the relay network, and a terminal device that performs wireless communication with the first node or the second node, the transmitter changing connection destination of the second node and the terminal device to the another base station respectively after elapse of the standby time included in the connection information.

2. The base station device according to claim 1, wherein the generating includes generating the connection information that includes identification information of the another base station device, information on radio resource used under the another base station device, and standby time information that indicates the standby time.

3. The base station device according to claim 2, wherein the generating includes generating the connection information that further includes topology information related to a connection relationship under the another base station device.

4. The base station device according to claim 1, wherein the transmitter transmits the connection information to the first node after having transmitted the connection information to the second node and the terminal device.

5. A wireless communication system comprising:
a donor base station device that is disposed at the highest level in a relay network; and
a plurality of node base station devices that form the relay network by establishing a wireless connection with each other and that are connected to the donor base station device, wherein
the donor base station device includes
processor circuitry that executes a process including
judging whether each of the plurality of node base station devices is allowed to be connected to another donor base station device, and
generating, when it is judged that a first node base station device is allowed to be connected to the another donor base station device, connection information that includes information related to the another donor base station device and standby time indicating a time period before the first node connects to the another donor base station device, and
a transmitter that transmits, via the first node base station device, the connection information to a second node base station device that is connected to a lower level of the first node base station device in the relay network, and a terminal device that performs wireless communication with the first node base station device or the second node base station device, the transmitter changing connection destination of the second node base station device and the terminal device to the another donor base station respectively after elapse of the standby time included in the connection information.

6. A connection change method performed by a base station device to which a plurality of nodes that form a relay network by establishing a wireless connection with each other are connected, the connection change method comprising:
judging whether each of the plurality of nodes is allowed to be connected to another base station device;
generating, when it is judged that a first node is allowed to be connected to the another base station device, connection information that includes information related to the another base station device and standby time indicating a time period before the first node connects to the another base station device; and
transmitting, via the first node, the generated connection information to a second node that is connected to a lower level of the first node in the relay network, and a terminal device that performs wireless communication with the first node or the second node, the transmitter changing connection destination of the second node and the terminal device to the another base station respectively after elapse of the standby time included in the connection information.

* * * * *